(12) United States Patent
Grossner et al.

(10) Patent No.: US 6,748,923 B2
(45) Date of Patent: Jun. 15, 2004

(54) INJECTION SYSTEM FOR AN INTERNAL COMBUSTION ENGINE AND METHOD FOR REGULATING AND/OR BLEEDING OF SAID SYSTEM

(75) Inventors: Thomas Grossner, Neutraubling (DE); Klaus Husslein, Regensburg (DE); Christoph Klesse, Woerth A.D.Donau (DE); Martin Werner, Hemau (DE); Eckbert Zander, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/431,107

(22) Filed: May 7, 2003

(65) Prior Publication Data

US 2003/0188716 A1 Oct. 9, 2003

Related U.S. Application Data

(63) Continuation of application No. PCT/DE01/04369, filed on Nov. 21, 2001.

(30) Foreign Application Priority Data

Nov. 22, 2000 (DE) .......................................... 100 57 786

(51) Int. Cl.⁷ .............................................. F02M 33/04
(52) U.S. Cl. ........................ 123/446; 123/495; 417/228
(58) Field of Search ................................ 123/495, 446, 123/447; 417/228

(56) References Cited

U.S. PATENT DOCUMENTS

| 6,021,761 A | * | 2/2000 | Kellner et al. | 123/495 |
| 6,543,425 B2 | * | 4/2003 | Mayer et al. | 123/495 |
| 2003/0101970 A1 | * | 6/2003 | Utsumi | 123/495 |

FOREIGN PATENT DOCUMENTS

| DE | 3801929 A1 | 8/1988 | F02M/45/12 |
| DE | 197 42 180 A1 | 3/1999 | F02M/37/06 |
| DE | 198 18 385 A1 | 10/1999 | F02M/37/00 |
| DE | 199 00 562 A1 | 7/2000 | F02M/37/04 |
| DE | 199 07 311 A1 | 8/2000 | F04B/1/04 |

* cited by examiner

Primary Examiner—Thomas N. Moulis
(74) Attorney, Agent, or Firm—Baker Botts L.L.P.

(57) ABSTRACT

An injection system for an internal combustion engine comprises a valve arrangement (26), connected to an inlet (24) to a high pressure pump (8), which regulates the flow of fuel for lubricating and cooling the high pressure pump (8) and bleeds the injection system. The valve arrangement 926) comprises at least one displaceable actuator and a first and second throttle device (30, 32). The actuator (36) is regulated according to a pressure of the fuel flow between a feed supply pump (6) and the high pressure pump (8), such that a first connection to, the high pressure pump (8) is opened, by means of the first throttle device (30), or the feed (24) to the high pressure pump (8) is interrupted, or a second connection to the high pressure pump (8) is opened, by means of the second throttle device (32). The invention further relates to a method of bleeding and/or regulating said injection system.

21 Claims, 4 Drawing Sheets

INJECTION SYSTEM FOR AN INTERNAL COMBUSTION ENGINE AND METHOD FOR REGULATING AND/OR BLEEDING OF SAID SYSTEM

CROSS-REFERENCE TO RELATED APPLICATION

This application is a continuation of co-pending International Application No. PCT/DE01/04369 filed Nov. 21, 2001, which designates the United States, and claims priority to German application number DE 10057786.5 filed Nov. 22, 2000.

BACKGROUND OF THE INVENTION

The invention relates to an injection system for an internal combustion engine, according to the preamble of claim 1, and to a method for regulating and/or bleeding an injection system for an internal combustion engine, according to the preamble of claim 9.

Such injection systems for internal combustion engines conventionally have a pre-feed pump which feeds the fuel to be injected out of a fuel tank via a fuel line and transfers it to a high-pressure pump which generates the injection pressure necessary for injecting the fuel into the combustion spaces of the internal combustion engine. In the case of a common-rail injection system, the high-pressure pump is connected on the outlet side to a high-pressure accumulator, from which the injectors assigned to the individual combustion spaces of the internal combustion engine procure the fuel to be injected.

The known injection systems also make it possible to scavenge the high-pressure pump with the fuel to be injected, with the result that a lubrication and cooling of the high-pressure pump are brought about. For this purpose, a feed branches off, between the pre-feed pump and the high-pressure pump, from the fuel line connecting the pre-feed pump to the high-pressure pump and issuing on the outlet side into the casing of the high-pressure pump. Via the feed, part of the fuel conveyed by the pre-feed pump is branched off and used for scavenging the high-pressure pump. The fuel used for scavenging purposes is subsequently returned to the fuel tank via a fuel return line.

As a result of the scavenging of the high-pressure pump by the fuel stream branched off from the feed stream, however, when the internal combustion engine is started the pressure build-up on the intake side of the high-pressure pump is delayed or even prevented, so that the internal combustion engine starts only with a retard or not at all. A regulating valve is therefore arranged in the feed branching off between the pre-feed pump and the high-pressure pump, said regulating valve releasing the scavenging stream in the feed only when the fuel pressure necessary for operating the high-pressure pump is reached on the intake side of the high-pressure pump.

In the known injection systems, the pre-feed pump and the high-pressure pump are driven via a mechanical connection by the internal combustion engine of the common-rail system, so that the rotational speed of the pre-feed and the high-pressure pump is proportional to the engine rotational speed. Since the rotational speed of the high-pressure pump is a function of the engine rotational speed, at low engine rotational speeds, which occur, for example, during starting, the high-pressure pump conveys only a relatively low volume flow into the high-pressure accumulator. For a rapid start of the engine, however, a rapid pressure build-up in the high-pressure accumulator is necessary. It is therefore necessary for the entire injection system to be constantly filled completely with fuel and contain as far as possible no air bubbles or gas bubbles. However, by the fuel tank being emptied, due to maintenance work on the system or as a result of leaks, air may infiltrate into the system. In order to prevent a delayed pressure build-up during the starting operation due to the included air in the system, therefore, bleeding devices are provided.

Normally, for bleeding the injection system in this way, individual bleeding valves or throttles are installed, in addition to the regulating valve for the scavenging stream, in the feed in the low-pressure region between the pre-feed pump and the high-pressure pump. What is to be achieved thereby is that the air can be discharged via the bleeding valves or throttles and cannot pass into the displacement spaces of the high-pressure pump. When a throttle is used, on the one hand, it is necessary, for a rapid escape of air, that the throttle has a relatively large throughflow cross section. On the other hand, the selected size of the throughflow cross section of the throttle must be sufficiently small, so that as little fuel as possible can escape through the throttle. A satisfactory dimensioning of the throttle in terms of the size of the throughflow cross section is therefore difficult to achieve. By contrast, when nonreturn valves are used as a bleeding device, it is always necessary to build-up a specific pressure in the fuel line, in order to open the nonreturn valve and thus bleed the injection system. In this case, however, at low starting rotational speeds of the engine, problems arise with regard to the build-up of a corresponding pressure which is sufficient for opening the nonreturn valve. The bleeding of the injection system is therefore not always ensured.

Furthermore, it is known to install a bleeding valve, in which a closing body is guided in a guide of the bleeding valve. Between the guide and the closing body is provided a capillary gap, via which the air included in the system is discharged during the bleeding operation. After bleeding, the fuel flows into the capillary gap. In this case, due to the high flow resistance of the fuel in the capillary gap, the closing body is taken up, so that the bleeding valve is closed by the closing body. Where a wetted capillary gap is concerned, however, there is the problem that the closing body is moved into its sealing position even during bleeding and the air can no longer escape completely through the capillary gap. Sufficient bleeding of the injection system is consequently difficult to achieve.

SUMMARY OF THE INVENTION

The object on which the invention is based is therefore to provide an injection system which can be bled simply and reliably, a rapid pressure build-up in the high-pressure accumulator being ensured at the same time, and a method for regulating and/or bleeding such an injection system.

This object can be achieved by an injection system for an internal combustion engine, comprising a pre-feed pump, a high-pressure pump, a high-pressure accumulator and at least one injector, which are connected to one another via a fuel line, in order to convey fuel out of a fuel tank via the pre-feed pump and the high-pressure pump into the high-pressure accumulator and to inject said fuel out of the high-pressure accumulator via the injector into a combustion chamber of the internal combustion engine, a feed for the high-pressure pump, said feed being connected to the fuel line between the pre-feed pump and the high-pressure pump, in order to supply fuel for lubrication and cooling to the high-pressure pump, and a valve device connected to the feed, which regulates the fuel stream for lubricating and cooling the high-pressure pump and/or bleeds the injection system, wherein the valve device comprises at least one movably arranged actuator and a first and a second throttle device, the actuator being set as a function of a pressure of the fuel stream between the pre-feed pump and the high-pressure pump, in such a way that a first connection through the first throttle device to the high-pressure pump is released or the feed to the high-pressure pump is interrupted or a second connection through the second throttle device to the high-pressure pump is released.

The object can also be achieved by an injection system for an internal combustion engine, with a pre-feed pump, a high-pressure pump, and a high-pressure accumulator which are connected to one another via a fuel line, in order to convey fuel out of a fuel tank via the pre-feed pump and the high-pressure pump into the high-pressure accumulator, a feed for the high-pressure pump, said feed being connected to the fuel line between the pre-feed pump and the high-pressure pump, in order to supply fuel for lubrication and cooling to the high-pressure pump and to bleed the injection system, and a valve device connected to the feed, which regulates the fuel stream for lubricating and cooling the high-pressure pump and which bleeds the injection system, and wherein the valve device comprises at least one movably arranged actuator and a first and a second throttle device, the actuator being set as a function of a pressure of the fuel stream between the pre-feed pump and the high-pressure pump, in such a way that a first connection through the first throttle device to the high-pressure pump is released or the feed to the high-pressure pump is interrupted or a second connection through the second throttle device to the high-pressure pump is released.

The first and the second throttle device may have different throughflow cross sections. The first and/or the second throttle device can be designed to be integrated in the actuator. The actuator may have at least one passage duct. The actuator can be designed as a throughflow-cross section actuator or pressure actuator. The valve device may comprise at least one directional valve and/or at least one pressure limiting valve. The throttle devices, the directional valve and/or the pressure limiting valve can be assembled in the valve device. The actuator can be set in such a way that the first connection through the second throttle device and the first throttle device is released.

Consequently, the injection system according to the invention has a pre-feed pump which supplies the high-pressure pump additionally with fuel for lubrication and cooling by means of a feed branching off from the fuel line to the high-pressure pump. In this case, the feed has arranged in it a valve device which, on the one hand, regulates the fuel stream for the lubrication and cooling of the high-pressure pump and, on the other hand, bleeds the injection system. Thus, before or during an operation to start the engine, the air included in the injection system can be discharged from the injection system via the valve device. Furthermore, the valve device ensures, preferably in interaction with an admission-pressure regulating valve and a high-pressure regulating valve, that the feed is interrupted, after bleeding, during the operation of starting the internal combustion engine. As a result of the interruption, it is possible that a pressure builds up in the fuel line to the high-pressure pump during the starting operation and that the high-pressure pump is filled completely with fuel. Moreover, in the event of a further pressure rise downstream of the pre-feed pump, there is provision for the valve device to release a scavenging path to the high-pressure pump. For this purpose, the valve device comprises at least one integrated actuator arranged movably in the valve device and also a first and a second throttle device.

As a function of a pressure of the fuel in the feed upstream of the valve device, the actuator in each case assumes a position in which either a first connection through the first throttle device to the high-pressure pump is released or the feed to the high-pressure pump is interrupted or a second connection through the second throttle device to the high-pressure pump is released. The combination according to the invention of the two throttle devices with the actuator in the valve device affords the great advantage that the fuel stream supplied from the pre-feed pump to the high-pressure pump is both regulated and at the same time bled via the valve device. The valve device according to the invention reacts automatically to the respective operating states of the engine via the pressure prevailing in each case in the fuel line downstream of the pre-feed pump. This ensures the bleeding of the system, a rapid pressure build-up in the high-pressure accumulator and therefore also an easy restarting of injection systems which contain included air.

It is preferred that the first and the second throttle device have different throughflow cross sections. It is thereby possible to adapt the throughflow cross sections of the individual throttles to a respective application. In this case, the first throttle device, which is preferably provided for bleeding the injection system, has, for example, a relatively small throughflow cross section, so that as little fuel as possible can escape. By contrast, the throughflow cross section of the second throttle device, via which the fuel stream for scavenging the high-pressure pump is conducted, is dimensioned sufficiently large for a reliable delivery of fuel for scavenging the high-pressure pump to be ensured. The throttle devices are thus in each case to be suitably dimensioned individually for the respective application.

For a compact form of construction of the valve device, advantages are afforded when the first and/or the second throttle device are designed to be integrated in the actuator of the valve device. As a result, even under confined conditions of space, the respective throttle device can be positioned at a desired point in the valve device.

For connecting a valve inlet to a valve outlet of the valve device, it has been shown to be advantageous for the actuator to have at least one passage duct, through which the fuel stream flowing through the valve device is conducted. The passage duct may be designed in a structurally simple way as a bore through the actuator.

It is further preferred for the actuator to be provided as a throughflow-cross section actuator or pressure actuator. As a result, in the event of a change in the pressure in the fuel line, a diversion of the throughflow paths of the fuel through the valve device can be achieved quickly and reliably. Thus, a double function of the valve device as a bleeding valve and a scavenging valve can be implemented in a simple way. Advantages are afforded, in this respect, when the valve device comprises at least one throughflow-cross section regulating valve or pressure regulating valve. For example, by providing at least one directional valve and/or at least one pressure limiting valve in the valve device, an adjustment of the throughflow path in the valve device can be achieved particularly simply and easily.

Furthermore, for a compact form of construction of the valve device, advantages are afforded, when the throttle devices, the at least one directional valve and/or the at least one pressure limiting valve are assembled in the valve device. The valves are in this case integrated in a structural element designed as a combination valve. As a result, even when the installation space in the high-pressure pump is restricted, the valve device can be connected reliably to the feed.

The object can also be achieved by a method for regulating and/or bleeding an injection system for an internal combustion engine, comprising a pre-feed pump, a high-pressure pump, a high-pressure accumulator and at least one injector, which are connected to one another via a fuel line, the method comprising the steps:

conveying fuel out of a fuel tank via the pre-feed pump and the high-pressure pump into the high-pressure accumulator, injecting the fuel out of the high-pressure accumulator via the injector into a combustion chamber of the internal combustion engine, branching off fuel for lubricating and cooling the high-pressure pump via a feed from the fuel line between the pre-feed pump and the high-pressure pump, and regulating the fuel stream in the feed and/or bleeding the injection system by means of a valve device, and moving at least one movably arranged actuator of the valve device essentially between three different positions in the valve device as a function of a pressure of the fuel stream between the pre-feed pump and the high-pressure pump.

In an initial position of the actuator, a first connection through a first throttle device to the high-pressure pump can be released and, with an increasing dynamic pressure of the fuel flowing through the valve device, the actuator can be moved out of its initial position into a second position, in which the first connection to the high-pressure pump is essentially interrupted, and subsequently into a third position, in which a second connection through a second throttle device to the high-pressure pump is released. In the initial position of the actuator, the first connection may run both through the second throttle device and through the first throttle device to the high-pressure pump. The fuel flow through the first connection can be lower than the fuel flow through the second connection. The fuel flow through the first connection can be lower than the fuel flow through the second connection.

As can be seen from the foregoing, according to the method, fuel for lubricating and cooling the high-pressure pump is branched off via a feed from the fuel line between the pre-feed pump and the high-pressure pump, the fuel stream being regulated and/or the injection system bled by means of the valve device in the feed. In this case, both the regulation of the fuel stream in the feed and the bleeding of the injection system are achieved by means of at least one actuator which is arranged movably in the valve device and which is adjusted essentially between three different positions in the valve device as a function of a pressure of the fuel stream in the feed. The pressure acting on the actuator in the valve device affords the great advantage that the valve device reacts automatically to the respective operating states and to the resulting pressures in the fuel line. This considerably simplifies the control and regulation of the fuel stream in the injection system. Furthermore, the movement of the actuator in the valve device also ensures the bleeding of the fuel system, so that a delayed pressure build-up due to air included in the injection system is effectively prevented.

According to an advantageous embodiment of the method according to the invention for regulating and bleeding the injection system, in a position of rest of the actuator a first connection through a first throttle device to the high-pressure pump is released. In the position of rest of the actuator, the bleeding of the injection system takes place, the air being discharged out of the low-pressure region to the high-pressure pump via the first throttle device. After bleeding, the actuator is moved, with an increasing dynamic pressure of the fuel stream flowing through the valve device, out of its position of rest into a second position, in which the connection to the high-pressure pump is essentially closed. In the second position, the feed is interrupted, that is to say essentially no scavenging stream flows to the high-pressure pump, so that the entire bled fuel stream is conveyed from the pre-feed pump to the high-pressure pump via the fuel line and a rapid pressure build-up in the high-pressure pump is ensured. Since the entire fuel stream is available for the pressure build-up, a delayed starting of the internal combustion engine is prevented. In the event of a further pressure rise, the actuator is moved into a third position, in which a second connection through a second throttle device to the high-pressure pump is released. In the third position, the fuel volume flow branched off from the fuel line via the feed flows to the high-pressure pump, in order to cool and lubricate the latter.

In a further embodiment, there flows through the first throttle device, in the position of rest of the actuator, a fuel stream which amounts to between ⅓ and ⅔ of the fuel quantity conveyed overall by the pre-feed pump. For example, during starting, the pre-feed pump conveys about 150 ml, about 5–10 ml flowing through a scavenging duct for bleeding. In the third position, several 100 ml can flow through the scavenging duct and consequently through the second throttle device for cooling through the high-pressure pump. In this case, at the changeover from the position of rest to the second position, the dynamic pressure preferably amounts to 0.2–0.4 bar. The changeover between the second position and the third position of the actuator is preferably between 1.5 and 2 bar. In this case, the inlet valve or inlet valves of the high-pressure pump open at about 0.7 bar. In embodiments with a higher opening pressure of the inlet valve, the changeover points between the position of rest and the second position or the second position and the third position of the actuator are displaced correspondingly.

BRIEF DESCRIPTION OF THE DRAWINGS

The invention is explained in more detail below with reference to embodiments illustrated by way of example in the drawings in which:

FIG. 3b shows a diagrammatic cross-sectional view of the valve device according to FIG. 3a;

FIG. 4b shows a diagrammatic cross-sectional view of the valve device according to FIG. 4a;

FIG. 5b shows a diagrammatic cross-sectional view of the valve device according to FIG. 5a;

FIG. 6b shows a diagrammatic cross-sectional view of the valve device according to FIG. 6a;

FIG. 7b shows a diagrammatic cross-sectional view of the valve device according to FIG. 7a.

DETAILED DESCRIPTION OF THE PREFERRED EMBODIMENTS

Figure 1:
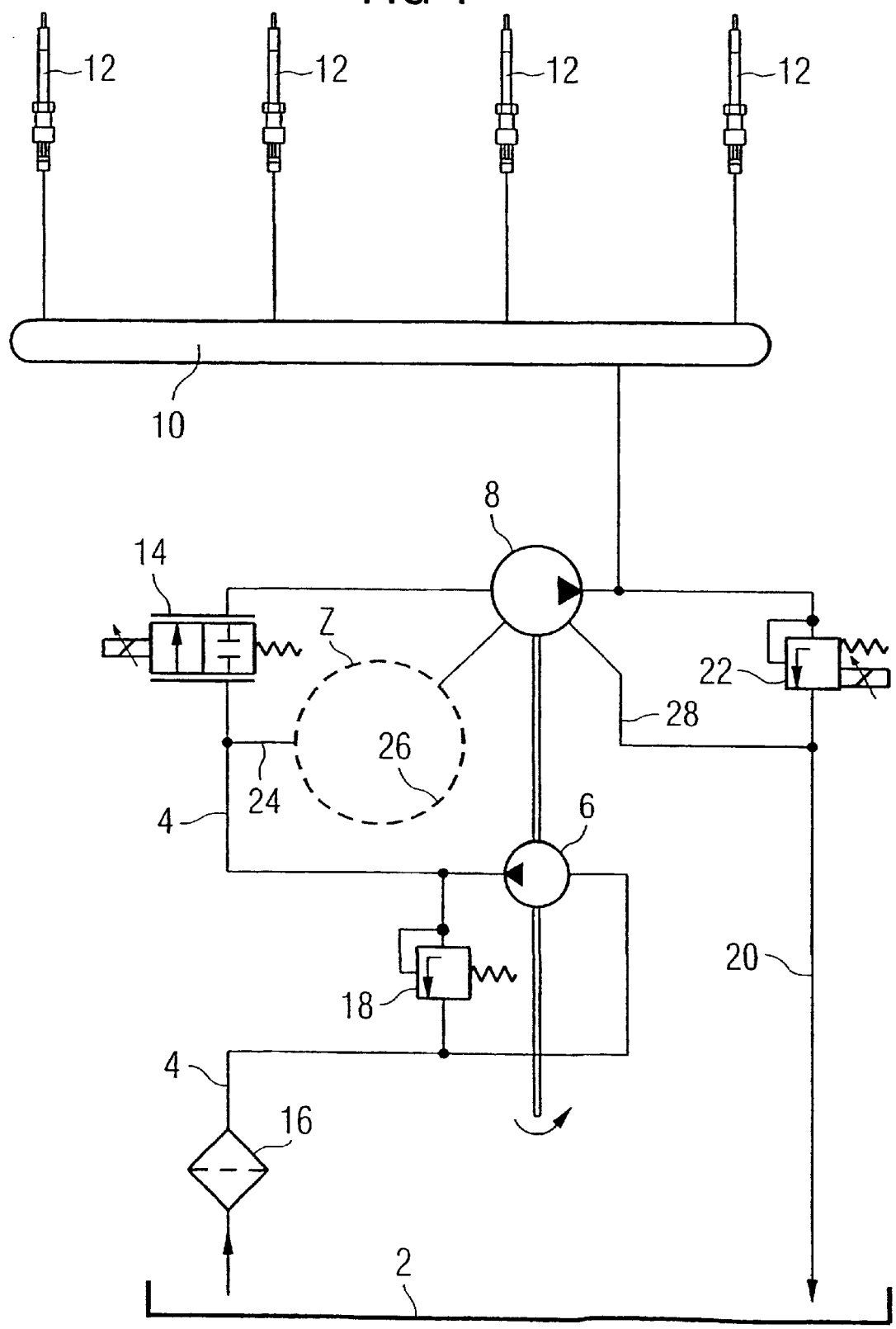
FIG. 1 shows an injection system with a valve device according to the invention provided at a point Z.

FIG. 1 shows diagrammatically the setup of an injection system, in which fuel is sucked out of a fuel tank 2 via a fuel line 4 by a pre-feed pump 6 driven mechanically, preferably via the internal combustion engine, and is conveyed through the pre-feed pump 6 to a high-pressure pump 8 driven mechanically likewise preferably via the internal combustion engine. The high-pressure pump 8 compresses the fuel and feeds it under high pressure into a high-pressure accumulator 10. The high-pressure accumulator 10 is connected to injectors 12, via which the fuel is injected into a combustion chamber of the internal combustion engine. A throughflow-cross section regulating valve 14 is arranged in the fuel line 4 between the pre-feed pump 6 and the high-pressure pump 8, in order to regulate the volume flow of the high-pressure pump 8 as a function of demand. Furthermore, the pre-feed pump 6 is connected on the intake side to the fuel tank 2 via a pre-filter 16.

Arranged on the intake side of the pre-feed pump 6 is an admission-pressure regulating valve 18 which, when a predetermined admission pressure is exceeded, branches off part of the fuel conveyed by the pre-feed pump 6 and returns it to the intake side of the pre-feed pump 6, in order to prevent the predetermined admission pressure from being exceeded and to keep the admission pressure constant.

The high-pressure accumulator 10 is connected to the fuel tank 2 via a fuel return line 20. In the fuel return line 20 is arranged a high-pressure regulating valve 22, by means of which the pressure in the high-pressure accumulator 10 can be regulated and set according to the desired operating conditions of the internal combustion engine.

Between the pre-feed pump 6 and the throughflow-cross section regulating valve 14, a feed 24 to the high-pressure pump 8 is connected to the fuel line 4, in order to supply fuel for lubrication and cooling to the mechanically driven high-pressure pump 8. The admission-pressure regulating valve 18 and the throughflow-cross section regulating valve 14 are connected successively to the fuel line 4, the feed 24 to the high-pressure pump bouncing off from the fuel line 4 upstream of the throughflow-cross section regulating valve 14 in the direction of flow and being designed as a connecting line to the high-pressure pump 8.

A valve device 26, not illustrated in FIG. 1, is arranged in the feed 24, at a point Z indicated by a broken line, on the inflow side to the high-pressure pump 8. Various embodiments of the valve device according to the invention in the feed 24 are explained in FIGS. 3a to 7b. The valve device 26, on the one hand, regulates the fuel stream for cooling and lubricating the high-pressure pump. On the other hand, the valve device 26 serves for bleeding the injection system. In order to form a closed lubricating and cooling circuit, the feed 24 is connected on the outflow side of the high-pressure pump 8 to the fuel tank 2 via a connecting line 28 and the fuel return line 20.

Figure 2:
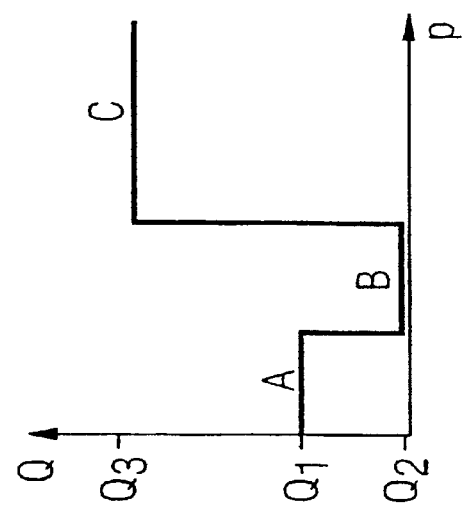
FIG. 2 shows a graph with an ideal characteristic curve of a valve device of the injection system according to the invention.

The functioning of the valve device 26 in the feed 24 between the pre-feed pump 6 and the high-pressure pump 8 is explained in more detail below with reference to FIG. 2. The valve device 26, which is installed in the high-pressure pump 8 at the point Z, serves, on the one hand, for bleeding the injection system during the operation of starting the internal combustion engine. On the other hand, via the valve device 26, the fuel stream for lubricating and cooling the high-pressure pump 8 is set. FIG. 2 illustrates, in a graph, a characteristic curve of the valve device 26 during operation, the throughflow cross section Q of the valve device 26 being plotted as a function of the pressure p downstream of the pre-feed pump 6. In the state of rest (portion A in FIG. 2), the valve device 26 releases a bleeding cross section Q1, through which the air which is included in the injection system and which infiltrates into the injection system, for example, during an emptying of the fuel tank 2 or as a result of leaks, escapes and is discharged from the injection system. After bleeding, a higher flow resistance prevails in the valve device 26 due to the flow of the fuel stream, freed essentially of air, through the valve device 26. By virtue of the higher flow resistance, the fuel stream builds up in the valve device 26 and thus builds up a dynamic pressure which is a function of the extent of bleeding of the fuel stream. The valve device 26 is closed via the dynamic pressure which builds up, so that the essentially closed throughflow cross section Q2 is obtained (portion B in FIG. 2), through which only a leakage stream escapes. The entire fuel stream conveyed by the pre-feed pump 6 is therefore available for feeding the high-pressure pump 8 and is supplied to the high-pressure pump 8 via the fuel line 4. When more fuel is thereupon conveyed by the pre-feed pump 6 than is removed by the high-pressure pump 8, for example after a starting of the engine at a higher rotational speed of the engine, the valve device 26 releases a throughflow cross section Q3 in the feed 24 for scavenging the high-pressure pump 8 (portion C in FIG. 2). Accordingly, as can be seen in FIG. 2, when there is no or only a low pressure p of the fuel stream downstream of the pre-feed pump 6, in the valve device 26 the bleeding cross section Q1 is released, which is sufficiently large to ensure a reliable bleeding of the injection system (portion A in FIG. 2). In the case of higher pressures p, the valve device 26 interrupts the feed 24, so that the high-pressure pump 8 is filled completely with fuel and a rapid pressure build-up in the high-pressure accumulator 10 is ensured (portion B in FIG. 2). In the event of further pressure rise p in the fuel line 4 and downstream of the pre-feed pump 6, the valve device 26 releases the scavenging path to the high-pressure pump 8 (portion C in FIG. 2). In this case, the valve device 26, via the prevailing dynamic pressure, reacts automatically to the respective operating states of the internal combustion engine and, by means of an initial bleeding of the injection system with subsequent regulation of the fuel stream for cooling and scavenging the high-pressure pump 8, ensures a rapid pressure build-up in the high-pressure accumulator 10. By the bleeding of the injection system in the state of rest of the valve device 26 and the regulation of the fuel stream for lubricating and cooling the high-pressure pump 8, a rapid pressure build-up in the high-pressure accumulator 10 is ensured during the operation of starting the internal combustion engine.

Figure 3A:
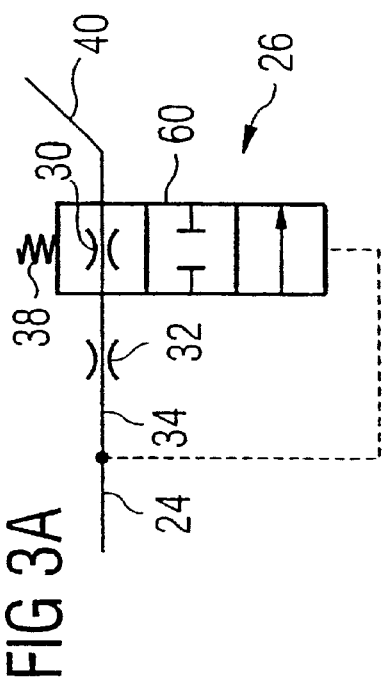
FIG. 3a shows a circuit diagram of a valve device according to a first embodiment of the invention.

FIG. 3a shows a circuit diagram of a first embodiment of a valve device 26 which is arranged in the injection system according to the invention at the point Z illustrated in FIG. 1. As can be seen in FIG. 3a, the valve device 26 is designed as a combination valve 60 which implements the functions of a throughflow-cross section regulating valve and of two throttle devices 30, 32 in a compact form of construction. The second throttle device 32 is provided in an inflow line 34 connected to the feed 24 and the first throttle device 30 is provided in an actuator of the valve device 26. In this case, the actuator is demonstrated by a restoring device 38 with a holding pressure. The actuator is in this case arranged in such a way that, in its initial position, it releases a first connection from the inflow line 34 through the second throttle device 32 and the first throttle device 30 into an inflow duct 40 to the high-pressure pump 8. In its second position, the actuator closes the feed 24 to the high-pressure pump 8. Furthermore, in its third position, the actuator is arranged in such a way that it releases a connection from the inflow line 34 through the first throttle device 30 and the inflow duct 40 to the high-pressure pump 8. In this case, the first throttle device 30 serves as a bleeding throttle, via which air included in the injection system escapes, and the second throttle device 32 serves as a scavenging throttle, via which the fuel stream for cooling and lubricating the high-pressure pump 8 can be set.

Figure 3B:
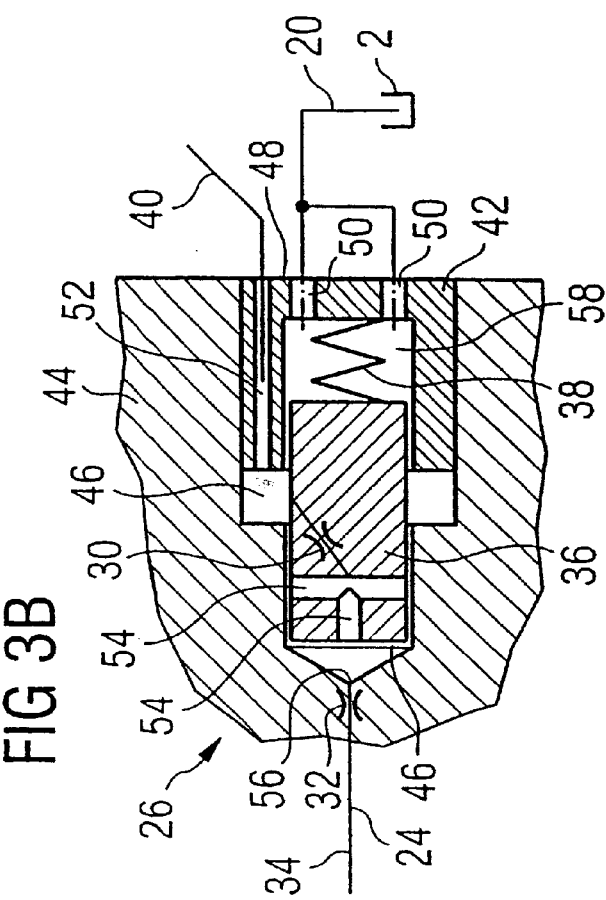

An exemplary embodiment of such a valve device 26 according to FIG. 3a is illustrated diagrammatically in cross section in FIG. 3b. The valve device 26 comprises a valve body 42 which is screwed, for example via a thread, not illustrated, into a housing 44 of the valve device 26. The valve body 42 and the housing 44 have in each case a cylindrical recess 46 with different diameters, in which the actuator 36 in the form of a cylindrical piston is introduced and guided. The actuator 36 is connected to one end face 48 of the valve body 42 via the restoring device 38 designed as a spring. Arranged in the end face 48 are outflow orifices 50 which are connected to the fuel return line 20 to the fuel tank 2. Alternatively, the outflow orifices may also be connected to the line 40. The actuator 36 is prestressed toward the end of the recess 46 of the housing 44 via the restoring device 38. Furthermore, the valve body 42 has an inner bore 52 which extends along the longitudinal extent of the recess 46 and which is connected to the inflow duct 40 to the high-pressure pump 8. In the actuator 36, a plurality of passage ducts 54 are provided, which make a connection from the inflow line 34 to the high-pressure pump 8 through the actuator 36. In the present instance, the first throttle device 30, which serves as a bleeding throttle, is designed to be integrated in the actuator 36 and is connected to a passage duct 54. By contrast, the second throttle device 32, acting as a scavenging throttle, is connected to the inflow line 34 and is installed in the housing 44 of the valve device 26 upstream of a valve inlet 56.

The fuel stream for cooling and lubrication is set by means of the second throttle device 32. In this case, the second throttle device 32 has a larger throughflow cross section than the first throttle device 30, in order to ensure a uniform scavenging stream to the high-pressure pump 8. A leakage stream of the valve device 26 flows into a spring space 58 and is discharged into the fuel return line 20 via the outflow orifices 50.

In the initial position, the actuator 36 is pressed against the abutment of the housing 44 by virtue of the spring force of the restoring device 38. In this case, the actuator 36 is arranged in the recess 46 of the valve device 26 in such a way that a first connection is released from the inflow line 34 through the second throttle device 32, a passage duct 54 oriented horizontally in FIG. 3b, the first throttle device 30 and the inner bore 52 of the valve body to the inflow duct 40 of the high-pressure pump 8. In the initial position of the valve device 26, the air can be discharged from the injection system via this first connection through the second and the first throttle device.

After bleeding, a dynamic pressure builds up at the first throttle device 30 of the actuator 36 by virtue of the small throughflow cross section, as soon as fuel flows through the valve device 26. The holding pressure of the restoring device 38 on the actuator 36 is set such that even a low pressure downstream of the pre-feed pump 6 is sufficient to displace the actuator 36 out of its initial position to the right into a second position. In the second position, a connection between the inflow line 34 and the inflow duct 40 is interrupted by the actuator 36. The inner bore 52 is in this case arranged in such a way that its orifice is closed by the actuator 36 in the second position. The first connection via the bleeding throttle 30 is thus closed and the complete fuel stream can be supplied from the pre-feed pump 6 to the high-pressure pump 8. A rapid pressure build-up in the high-pressure pump 8 is thereby ensured.

When the feed stream provided by the pre-feed pump 6 is higher than that required by the high-pressure pump 8, the dynamic pressure rises further at the bleeding throttle 30, so that the actuator 36 is moved into a third position counter to the restoring device 38. In the third position, a second connection via the scavenging throttle 32 is opened. The second connection releases a path for the fuel stream from the inflow line 34 through the horizontally oriented passage duct 54, a second passage duct 54 arranged at right angles to the latter, and the inner bore 52 to the inflow duct 40 of the high-pressure pump 8. In the second position of the actuator 36, the injection system is in its normal operating state. The high-pressure pump 8 is cooled and lubricated by the fuel volume flow branched off in the feed 24.

Figure 4A:
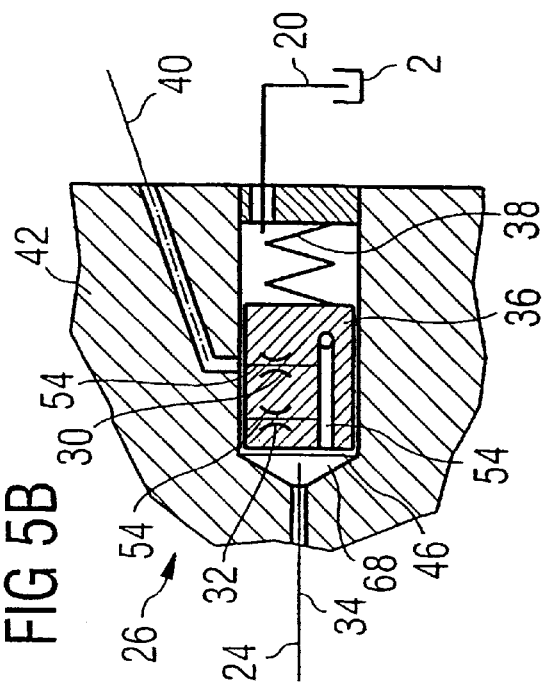
FIG. 4a shows a circuit diagram of a valve device according to a second embodiment of the invention.

FIG. 4a shows a second embodiment of a valve device in a circuit diagram in which, in contrast to FIG. 3a, the second throttle device 32 (scavenging throttle) is arranged in the inflow duct 40 to the high-pressure pump 8. Accordingly, in the present instance, the valve device 26 comprises a combination valve 60, which includes both the function of a throughflow-cross section regulating valve and the function of the first throttle device 30 provided as a bleeding throttle, and the second throttle device 32 designed as a scavenging throttle. The setup of the valve device 26 shown in FIG. 4a corresponds essentially to that according to FIG. 3a, although, according to FIG. 4a, the second throttle device 32 is connected to the inflow duct 40 to the high-pressure pump 8.

Figure 4B:
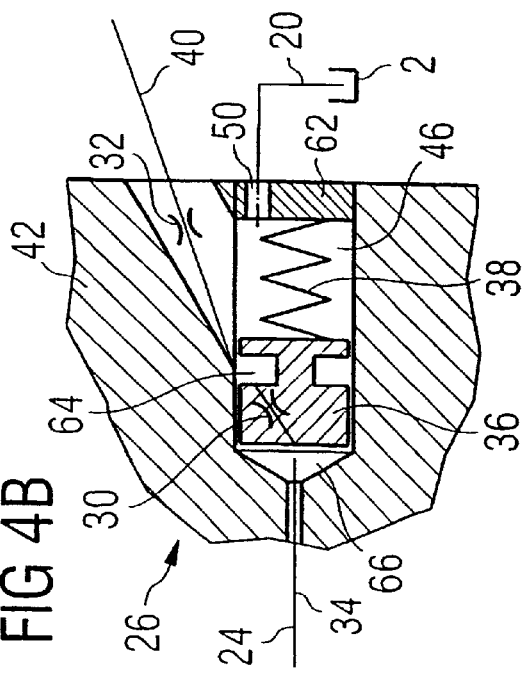

FIG. 4b shows an exemplary embodiment of a valve device 26 with the circuit diagram according to FIG. 4a. The valve body 42 has the cylindrical recess 46, in which the actuator 36 of the valve device 26 is arranged movably. The actuator 36 is in this case attached via the restoring device 38 to a closing element 62 for the recess 46 and, in the initial position, is prestressed by the restoring device 38 toward that end of the recess 46 which is located opposite the closing element 62.

During a starting operation with air in the injection system, the air is led via the inflow line 34 through the first throttle device 30 integrated in the actuator 36 and through a peripheral groove 64 formed on the actuator 36 into the inflow duct 40 to an inner space of the high-pressure pump 8. When the air has escaped completely via this first connection from the inflow line 34 via the first throttle device 30 to the high-pressure pump 8, the dynamic pressure builds up at the bleeding throttle 30. The dynamic pressure moves the actuator 36 counter to the holding force of the restoring device 38 out of its position of rest to a second position, in which the first connection via the bleeding throttle 30 and the feed 24 is closed. In the second position of the actuator 36, the entire fuel stream provided by the pre-feed pump 6 can be supplied directly to the high-pressure pump 8. As soon as the feed stream from the pre-feed pump 6 is such that the high-pressure pump 8 is filled completely, the pressure rises further at the actuator 36 and pushes the actuator 36, counter to the holding force of the restoring device 38, further to the right into a third position, in which a second connection via the second throttle device 32 is opened. The second connection runs from the inflow line 34 through a control space 66, which is formed between the left end of the cylindrical recess 46 and the front face of the actuator 36, into the inflow duct 40 and through the second throttle device 32, designed as a scavenging throttle, to the high-pressure pump 8. In the third position of the actuator 36, the injection system is in the normal operating state, the scavenging stream to the high-pressure pump 8 being capable of being set via the valve device 26. A leakage stream occurring in the valve device 26 during scavenging can be returned into the fuel tank 2 via the outflow orifice 50, formed in the disk-shaped closing element 62, and the fuel return line 20.

Figure 5A:
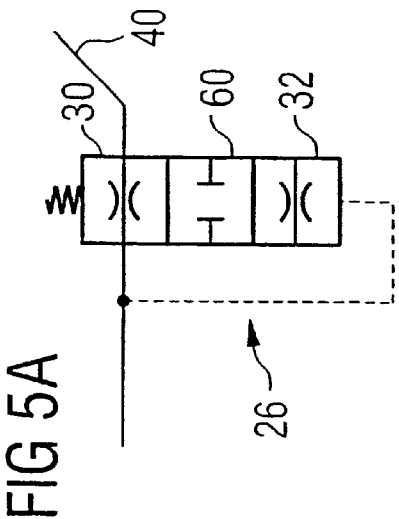
FIG. 5a shows a circuit diagram of a valve device according to a third embodiment of the invention.
Figure 5B:
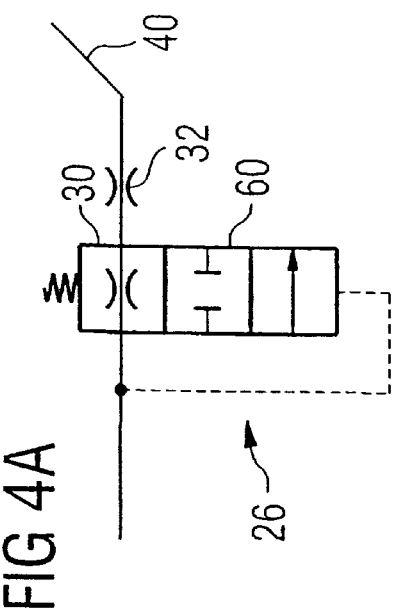

FIG. 5*a* shows a third embodiment of a circuit diagram of a valve device 26, in which the valve device 26 implements the functions of the first 30 and of the second throttle device 32 in a compact form of construction in the combination regulating valve 60. According to the exemplary embodiment, illustrated in a diagrammatic cross-sectional view in FIG. 5*b*, of a valve device 26 having the circuit diagram according to FIG. 5*a*, both throttle devices 30, 32 are integrated in the actuator 36 of the valve device 26. In this case, the first and the second throttle device 30, 32 are arranged parallel to one another and are connected in each case to a passage duct 54 of the actuator 36. In the position of rest, the actuator 36 is arranged in the recess 46 of the valve body 42 in such a way that a first connection for bleeding the injection system is released from the inflow line 34 into the control space 66 through a horizontal passage duct 54 of the actuator 36 and through the first throttle device 30 into the inflow duct 40 to the inner space of the high-pressure pump 8. With an increasing dynamic pressure at the first throttle device 30, the actuator 36 is displaced to the right into its second position counter to the spring force of the restoring device 38, so that an orifice of the inflow duct 40 into the recess 46 is closed by the actuator 36. In this second position, the feed 24 to the high-pressure pump 8 is interrupted. After the starting of the engine and after higher rotational speeds, the dynamic pressure rises further, with the result that the actuator 36 is moved further to the right into its third position. In the third position, a second connection is then released from the inflow line 34 into the control space 66 through a portion of the horizontal passage duct 54 and through the second throttle device 32, acting as a scavenging throttle, into the inflow duct 40 for the scavenging of the high-pressure pump 8.

Figure 6A:
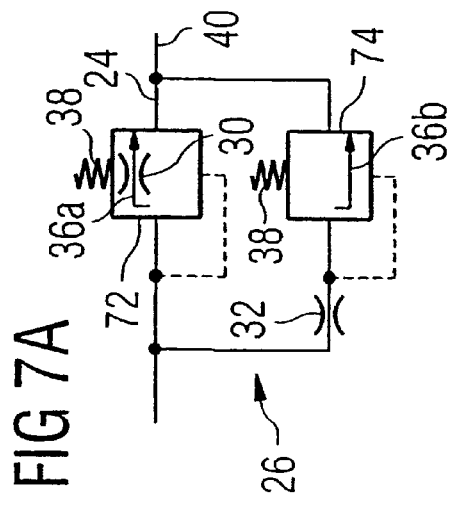
FIG. 6a shows a circuit diagram of a valve device according to a fourth embodiment of the invention.

FIG. 6*a* shows a fourth embodiment of a circuit diagram for a valve device according to the invention. The valve device 26 consists of the combination valve 60 designed as a 3/3-way valve, of the first throttle device 30 which is arranged in the inflow duct 40 and of the second throttle device 32 which is provided in the inflow line 34 to the combination valve 60. Furthermore, a leakage return line 68 is provided, which returns a leakage stream, emerging from the combination valve 60, into the inflow duct 40 to the high-pressure pump 8.

Figure 6B:
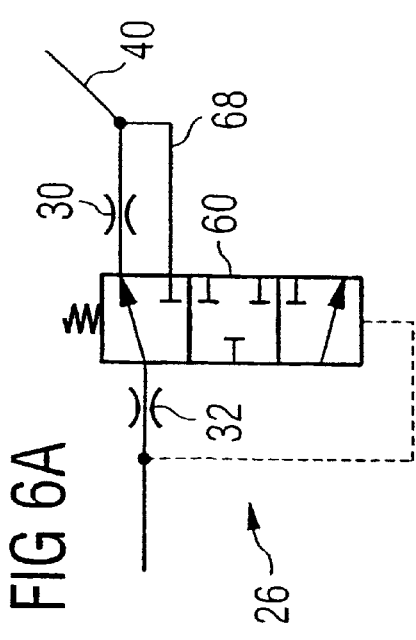

FIG. 6*b* illustrates in cross section an exemplary embodiment of a valve device 26 having a circuit diagram according to FIG. 6*a*, in which the actuator 36 is a movable piston arranged in the cylindrical recess 46 of the valve body 42. The piston has a peripheral groove 64 which forms an annular duct 68 in the wall of the actuator 36. A passage duct 54 of the actuator 36 opens into the annular duct 70, so that, in the initial position of the actuator 36, as shown in FIG. 6*b*, the injection system is released via a first connection from the inflow line 34 into the control space 66 through the passage duct 54 into the annular duct 70 and through the first throttle device 30 connected to the inflow duct 40. In this position of rest of the actuator 36, the injection system is bled. After bleeding, the dynamic pressure at the first throttle device 30 and the actuator 36 rises, so that the actuator 36 is displaced to the right counter to the spring force of the restoring device 38, until the connection between the annular duct 70 and the inflow duct 40 to the high-pressure pump 8 is interrupted. In the second position, the valve device 26 is closed. With an increasing dynamic pressure after the filling of the high-pressure pump 8, the actuator 36 is displaced even further to the right into its third position counter to the spring force. In the third position, the second connection for scavenging the high-pressure pump 8 with fuel is released, said connection running from the inflow line 34 through the second throttle device 32 arranged in the valve body 42, through the control space 66 and the passage duct 54 into a transfer 80 and subsequently through the outflow orifice 50 and the leakage line 68 into the inflow duct 40 to the high-pressure pump 8. In this case, the transfer 80 is designed as an indentation in the valve body 42 on a side wall of the recess 46. Furthermore, in the present instance, a leakage stream which occurs is discharged into the inflow duct 40 via the outflow orifice 50 arranged in the closing element 62 of the recess 46 and via the leakage return line 68.

Figure 7A:
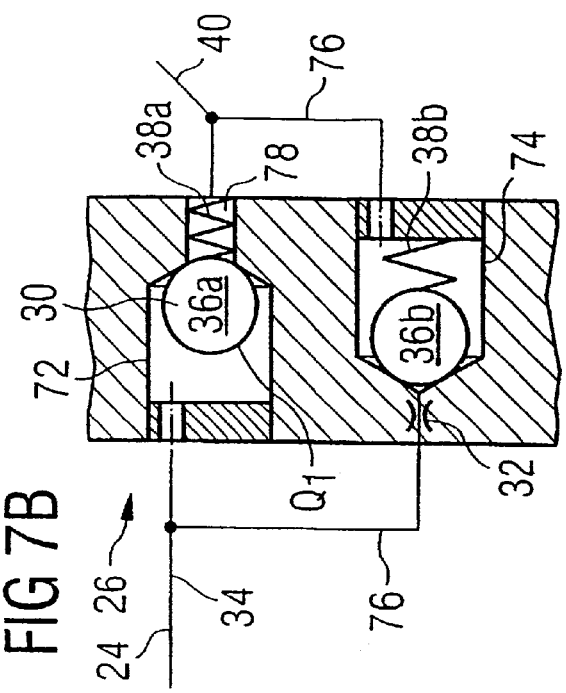
FIG. 7a shows a circuit diagram of a valve device according to a fifth embodiment of the invention.

FIG. 7*a* shows a circuit diagram of a valve device according to a fifth embodiment of the invention. In this case, the valve device 26 comprises two parallel-connected pressure regulating valves 72, 74. The pressure regulating valves 72, 74 each have an actuator 36*a*, 36*b* designed as a pressure closing member, said actuators being acted upon in each case by a restoring device 38*a*, 38*b*, preferably a spring device. The first pressure regulating valve 72 is arranged in the feed 24 to the high-pressure pump 8 and comprises the first throttle device 30. A connecting line 76 branches off from the inflow line 34 connected to the feed 24, upstream of the first pressure regulating valve 72, said connecting line being connected again, downstream of the first pressure regulating valve 72, to the feed 24 and the inflow duct 40 to the high-pressure pump 8. The second throttle device 32 and the second pressure regulating valve 74 are provided successively in the connecting line 76.

Figure 7B:
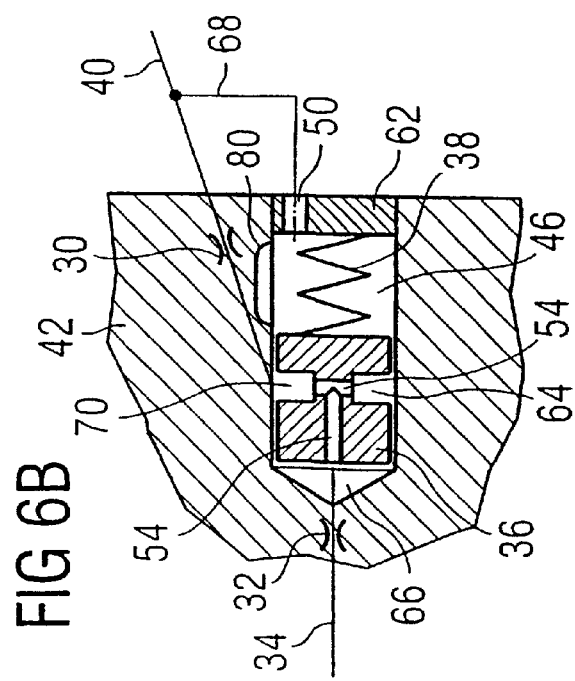

As can be seen in FIG. 7*b*, in the illustrated initial position of the first actuator 36*a* of the first pressure regulating valve 72, the actuator 36*a* releases the bleeding cross section Q1 which serves for throttling. By contrast, in the initial position of the valve device 26, the second actuator 36*b* of the second pressure regulating valve 74 is acted upon by the holding pressure of the restoring device 38 and closes the connecting line 76. The air can escape from the fuel stream supplied via the inflow line 34 through the bleeding cross section Q1 of the first pressure regulating valve 72 into the inflow duct 40 to the high-pressure pump 8.

After bleeding, the dynamic pressure at the first throttle device 30 integrated in the first pressure regulating valve 72 increases, so that the first actuator 36*a* is pressed counter to the spring force of the first restoring device 38*a* and, in its second position, closes a valve outlet 78 into the inflow duct 40. In this case, the restoring force of the second restoring device 38*b* is set in such a way that, in the second position of the first actuator 36*a*, the connecting line 76 is also closed by the second actuator 36*b*. Thus, in the second position, the feed 24 to the high-pressure pump 8 is interrupted, so that the entire fuel stream can be supplied to the high-pressure pump for a rapid pressure build-up.

After the filling of the high-pressure pump 8, the pressure downstream of the pre-feed pump 6 rises further, so that a higher dynamic pressure prevails in the valve device 26. Due to the high dynamic pressure, the first pressure regulating valve 72 remains closed. However, the second actuator 36b of the second pressure regulating valve 74 is moved to the right counter to the spring force of the restoring device 38b, so that a connection is released through the second pressure regulating valve 74 in the connecting line 76. In this third position of the pressure regulating valves, in which the first pressure regulating valve 72 is closed and the second pressure regulating valve 74 is open, a scavenging stream flows from the inflow line 34 via the connecting line 76 through the second pressure regulating valve 74 into the inflow duct 40 to the high-pressure pump. This ensures a lubrication and cooling of the high-pressure pump 8 in the normal operating state of the injection system. The scavenging stream to the high-pressure pump 8 can be regulated and set via the second throttle device 32 which is arranged upstream of the second pressure regulating valve 74 in the connecting line 78.

What is claimed is:

1. An injection system for an internal combustion engine, comprising:
    a pre-feed pump, a high-pressure pump, a high-pressure accumulator and at least one injector, connected to one another via a fuel line, in order to convey fuel out of a fuel tank via the pre-feed pump and the high-pressure pump into the high-pressure accumulator and to inject said fuel out of the high-pressure accumulator via the injector into a combustion chamber of the internal combustion engine,
    a feed for the high-pressure pump, said feed being connected to the fuel line between the pre-feed pump and the high-pressure pump, in order to supply fuel for lubrication and cooling to the high-pressure pump, and
    a valve device connected to the feed, which regulates the fuel stream for lubricating and cooling the high-pressure pump and/or bleeds the injection system, wherein the valve device comprises at least one movably arranged actuator and a first and a second throttle device, the actuator being set as a function of a pressure of the fuel stream between the pre-feed pump and the high-pressure pump, in such a way that a first connection through the first throttle device to the high-pressure pump is released or the feed to the high-pressure pump is interrupted or a second connection through the second throttle device to the high-pressure pump is released.

2. The injection system as claimed in claim 1, wherein the first and the second throttle device have different throughflow cross sections.

3. The injection system as claimed in claim 1, wherein the first and/or the second throttle device are designed to be integrated in the actuator.

4. The injection system as claimed in claim 1, wherein the actuator has at least one passage duct.

5. The injection system as claimed in claim 1, wherein the actuator is designed as a throughflow-cross section actuator or pressure actuator.

6. The injection system as claimed in claim 1, wherein the valve device comprises at least one directional valve and/or at least one pressure limiting valve.

7. The injection system as claimed in claim 6, wherein the throttle devices, the directional valve and/or the pressure limiting valve are assembled in the valve device.

8. The injection system as claimed in claim 1, wherein the actuator is set in such a way that the first connection through the second throttle device and the first throttle device is released.

9. A method for regulating and/or bleeding an injection system for an internal combustion engine, comprising a pre-feed pump, a high-pressure pump, a high-pressure accumulator and at least one injector, which are connected to one another via a fuel line, the method comprising the steps:
    conveying fuel out of a fuel tank via the pre-feed pump and the high-pressure pump into the high-pressure accumulator,
    injecting the fuel out of the high-pressure accumulator via the injector into a combustion chamber of the internal combustion engine,
    branching off fuel for lubricating and cooling the high-pressure pump via a feed from the fuel line between the pre-feed pump and the high-pressure pump, and
    regulating the fuel stream in the feed and/or bleeding the injection system by means of a valve device, and
    moving at least one movably arranged actuator of the valve device essentially between three different positions in the valve device as a function of a pressure of the fuel stream between the pre-feed pump and the high-pressure pump.

10. The method as claimed in claim 9, wherein in an initial position of the actuator, a first connection through a first throttle device to the high-pressure pump is released and, with an increasing dynamic pressure of the fuel flowing through the valve device, the actuator is moved out of its initial position into a second position, in which the first connection to the high-pressure pump is essentially interrupted, and subsequently into a third position, in which a second connection through a second throttle device to the high-pressure pump is released.

11. The method as claimed in claim 9, wherein in the initial position of the actuator, the first connection runs both through the second throttle device and through the first throttle device to the high-pressure pump.

12. The method as claimed in claim 10, wherein the fuel flow through the first connection is lower than the fuel flow through the second connection.

13. The method as claimed in claim 11, wherein the fuel flow through the first connection is lower than the fuel flow through the second connection.

14. An injection system for an internal combustion engine, comprising:
    a pre-feed pump, a high-pressure pump, and a high-pressure accumulator connected to one another via a fuel line, in order to convey fuel out of a fuel tank via the pre-feed pump and the high-pressure pump into the high-pressure accumulator, and
    a feed for the high-pressure pump, said feed being connected to the fuel line between the pre-feed pump and the high-pressure pump, in order to supply fuel for lubrication and cooling to the high-pressure pump and to bleed the injection system, and
    a valve device connected to the feed, which regulates the fuel stream for lubricating and cooling the high-pressure pump and which bleeds the injection system, and wherein the valve device comprises at least one movably arranged actuator and a first and a second throttle device, the actuator being set as a function of a pressure of the fuel stream between the pre-feed pump and the high-pressure pump, in such a way that a first connection through the first throttle device to the high-pressure pump is released or the feed to the high-pressure pump is interrupted or a second connection through the second throttle device to the high-pressure pump is released.

15. The injection system as claimed in claim 14, wherein the first and the second throttle device have different throughflow cross sections.

16. The injection system as claimed in claim 14, wherein the first and/or the second throttle device are designed to be integrated in the actuator.

17. The injection system as claimed in claim 14, wherein the actuator has at least one passage duct.

18. The injection system as claimed in claim 14, wherein the actuator is designed as a throughflow-cross section actuator or pressure actuator.

19. The injection system as claimed in claim 14, wherein the valve device comprises at least one directional valve and/or at least one pressure limiting valve.

20. The injection system as claimed in claim 19, wherein the throttle devices, the directional valve and/or the pressure limiting valve are assembled in the valve device.

21. The injection system as claimed in claim 14, wherein the actuator is set in such a way that the first connection through the second throttle device and the first throttle device is released.

* * * * *